O. N. PERKINS.
Lamp.
No. 130,530.             Patented Aug. 13, 1872.
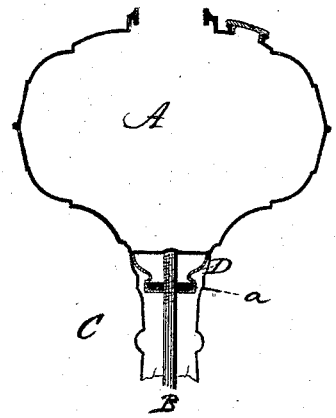
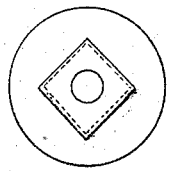

UNITED STATES PATENT OFFICE.

ORSON N. PERKINS, OF MERIDEN, CONNECTICUT, ASSIGNOR TO E. MILLER & CO., OF SAME PLACE.

IMPROVEMENT IN LAMPS.

Specification forming part of Letters Patent No. 130,530, dated August 13, 1872.

*To all whom it may concern:*

Be it known that I, ORSON N. PERKINS, of Meriden, in the county of New Haven and State of Connecticut, have invented a new Improvements in Lamps; and I do hereby declare the following, when taken in connection with the accompanying drawing and the letters of reference marked thereon, to be a full, clear, and exact description of the same, and which said drawing constitutes part of this specification, and represents, in—

Figure 1, a vertical central section of the bowl and upper portion of the standard of a lamp designed for burning kerosene or similar fluid; Fig. 2, the lower portion or nut holder of the bowl detached; and in Fig. 3, an underside view of the cup.

This invention relates to an improvement in the construction of that class of lamps in which the bowl is arranged upon a tubular standard, between the bowl and base, and all secured together by a bolt or rod screwing into a nut, which is attached to the bowl, and another nut under the base. Heretofore the nut attached to the bowl has been set loosely into a recess or chamber formed at the bottom of the bowl, and the looseness of the nut made it difficult to engage the rod with the nut. The object of this invention is to attach the nut in a rigid central position; and it consists in inclosing the nut within a cup-shaped chamber, formed from sheet metal, the metal closed tight upon and around the nut, the angles of the nut thus inclosed prevent its turning and hold it firmly in a central position; and this chamber, after the nut is so secured, is attached to the lamp-bowl.

A is the bowl of an ordinary lamp; B, the rod which secures the bowl to the base; C, the tubular standard between the base and bowl, and through which the rod B passes to the nut attached to the bottom of the bowl. D is a cup, formed from sheet metal, shown full size, Fig. 2, and within which, previous to completion, a nut, *a*, as shown in solid black, is inclosed; this nut having several sides and angles, and the metal of the cup inclosed thereon, as seen in Fig. 1, the nut is firmly held in a central position, as denoted in broken lines, Fig. 3. Thus completed the cup is ready for attachment to the bowl, and is secured by soldering or otherwise in a central position. (See Fig. 1.) This placed in the tubular standard, the bolt is inserted into the nut, and there is no liability of its changing its position, as in the common construction where the nut is loose.

I claim—

The cup D, attached to the bottom of the bowl A of the lamp and inclosing and securing the nut *a*, substantially in the manner described.

ORSON N. PERKINS.

Witnesses:
JOHN IVES,
G. W. CURTISS.